United States Patent
Bae et al.

(10) Patent No.: US 12,237,917 B2
(45) Date of Patent: Feb. 25, 2025

(54) PDCCH DECODING WITH KNOWN DCI BITS

(71) Applicant: Samsung Electronics Co., Ltd., Suwon-si (KR)

(72) Inventors: Jung Hyun Bae, San Jose, CA (US); Daeson Kim, San Jose, CA (US); Jinhong Wu, San Jose, CA (US); Mohamad Monzer Mansour, San Jose, CA (US); Dongwoon Bai, San Jose, CA (US); Kee-Bong Song, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 214 days.

(21) Appl. No.: 17/845,219

(22) Filed: Jun. 21, 2022

(65) Prior Publication Data

US 2023/0275693 A1    Aug. 31, 2023

Related U.S. Application Data

(60) Provisional application No. 63/314,920, filed on Feb. 28, 2022.

(51) Int. Cl.
*H03K 9/00* (2006.01)
*H04L 1/00* (2006.01)

(52) U.S. Cl.
CPC .......... *H04L 1/0045* (2013.01); *H04L 1/0057* (2013.01); *H04L 1/0067* (2013.01)

(58) Field of Classification Search
CPC .... H04L 1/0045; H04L 1/0057; H04L 1/0067
USPC ......................................... 375/316, 219, 295
See application file for complete search history.

(56) References Cited

U.S. PATENT DOCUMENTS

| | | | |
|---|---|---|---|
| 9,544,892 B2 | 1/2017 | Kim et al. | |
| 10,123,322 B1 | 11/2018 | Nam et al. | |
| 10,187,136 B2 | 1/2019 | Shimezawa et al. | |
| 11,005,597 B2 | 5/2021 | Xi et al. | |
| 2017/0366199 A1* | 12/2017 | Ge | H03M 13/09 |
| 2019/0268884 A1 | 8/2019 | Sano et al. | |
| 2019/0393987 A1* | 12/2019 | Hong | H04L 1/0061 |
| 2020/0304230 A1 | 9/2020 | Papasakellariou | |
| 2021/0029694 A1 | 1/2021 | Nayeb Nazar et al. | |
| 2021/0219296 A1* | 7/2021 | Lei | H04L 1/0007 |
| 2021/0298052 A1 | 9/2021 | Namba et al. | |
| 2022/0338119 A1* | 10/2022 | Seo | H04W 72/044 |

* cited by examiner

*Primary Examiner* — Zewdu A Kassa
(74) *Attorney, Agent, or Firm* — Lewis Roca Rothgerber Christie LLP

(57) ABSTRACT

Provided is a method of decoding, the method including receiving, by a user equipment (UE), a downlink control information (DCI) that is encoded, identifying, by the UE, a first bit position of the DCI as a known bit, and reducing a number of candidate code words for the DCI based on the known bit.

20 Claims, 13 Drawing Sheets

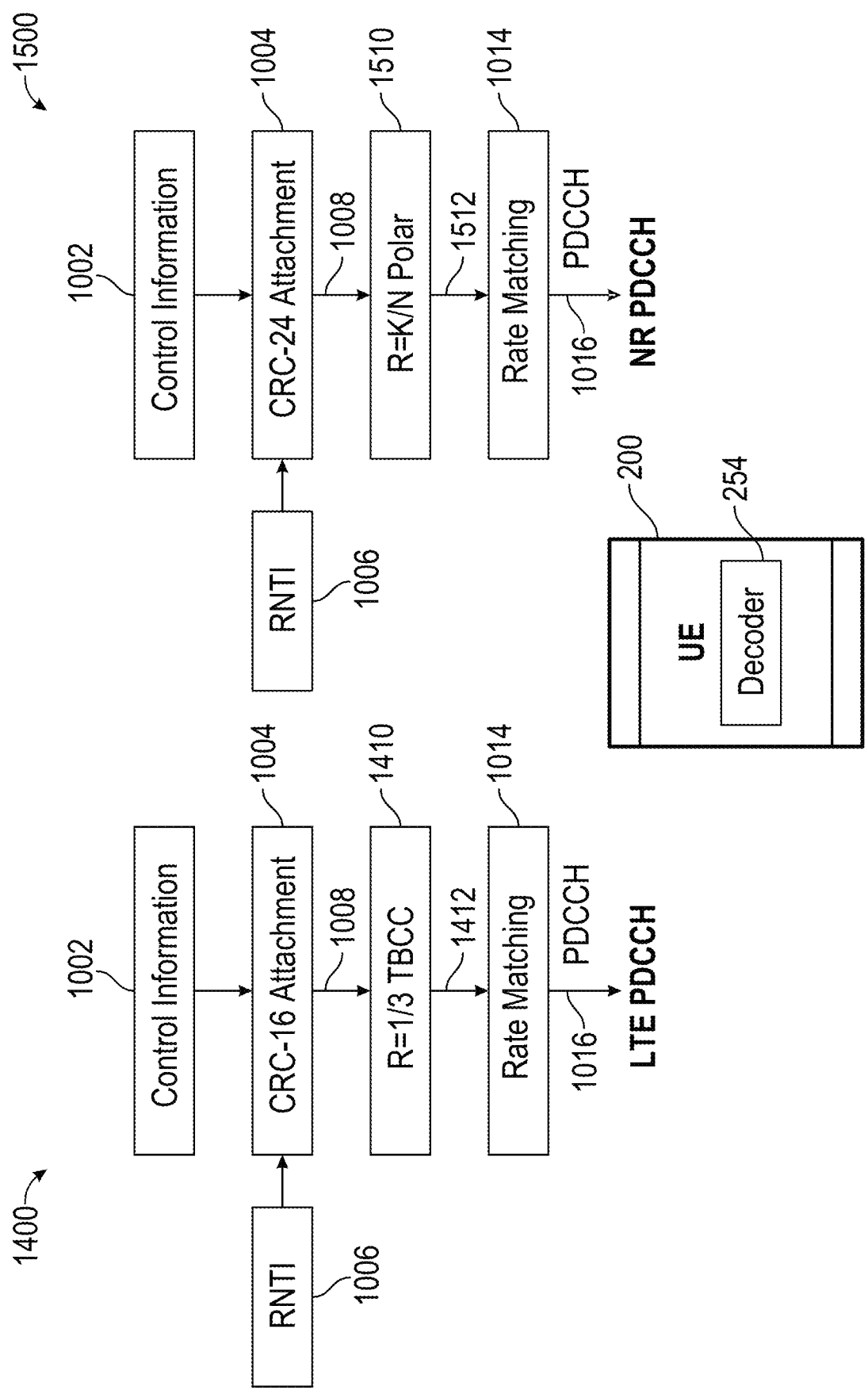

FIG. 2

Table 0-1: RNTIs, Search Spaces, DCI formats and Usage for PDCCH

| RNTI | Search space | DCI format | Usage |
|---|---|---|---|
| SI-RNTI | Common type 0/0A | 1-0 | system information (SI) |
| P_RNTI | Common type 2 | 1-0 | paging, SI change |
| RA-RNTI / Temporary C-RNTI | Common type 1 | 1-0 | random access response |
| C-RNTI | Common, UE-specific | 0-0, 0-1, 1-0, 1-1 | unicast scheduling |
| SFI-RNTI | Common type 3 | 2-0 | notifying the slot format |
| INT-RNTI | Common type 3 | 2-1 | notifying the PRB(s) and OFDM symbol(s) |
| TPC-PUCCH-RNTI / TPC-PUSCH-RNTI | Common type 3 | 2-2 | TPC commands for PUCCH and PUSCH |
| TPC-SRS-RNTI | Common type 3 | 2-3 | TPC commands for SRS transmissions by one or more UEs |

FIG. 3

Table 0-2: DCI format of NR PDCCH

| DCI Format | DCI Size (MIN/MAX) | DL/UL | Type | RNTI | Purpose |
|---|---|---|---|---|---|
| 0-0 | 27/36 | UL | Common, UE-specific | C-RNTI/CS-RNTI/MCS-C-RNTI | Dynamically scheduled unicast transmission / Configured scheduled unicast transmission (activation, reactivation and retransmission) |
| 0-0 | 27/36 | UL | Common, UE-specific | TC-RNTI | Contention Resolution (when no valid C-RNTI is available) |
| 0-1 | 28/95 | UL | Common, UE-specific | C-RNTI/CS-RNTI/SP-CSI-RNTI/MCS-C-RNTI | Dynamically scheduled unicast transmission / Configured scheduled unicast transmission (activation, reactivation and retransmission) / Activation of Semi-persistent CSI reporting on PUSCH |
| 1-0 | 62/71 | DL | Common, UE-specific | C-RNTI/CS-RNTI/MCS-C-RNTI | Dynamically scheduled unicast transmission / Configured scheduled unicast transmission (activation, reactivation and retransmission) |
| 1-0 | 35/44 | DL | Common | P-RNTI | Paging and system information change notification |
| 1-0 | 35/44 | DL | Common | SI-RNTI | Broadcast of system information |
| 1-0 | 35/44 | DL | Common | RA-RNTI | Random access response |
| 1-0 | 35/44 | DL | Common, UE-specific | TC-RNTI | Contention Resolution (when no valid C-RNTI is available) |
| 1-1 | 32/86 | DL | Common, UE-specific | C-RNTI/CS-RNTI/MCS-C-RNTI | Dynamically scheduled unicast transmission / Configured scheduled unicast transmission (activation, reactivation and retransmission) |

FIG. 4A

Table 0-3: DCI format 1-0

| Information | Bit Length | Bit width | Fixed in DCI | Known bit |
|---|---|---|---|---|
| Identifier for DCI formats | 1 | 1 | O | O |
| Carrier indicator | 0 or 3 | 0 | | |
| Bandwidth part indicator | 0, 1, or 2 | 0 | | |
| Frequency domain resource assignment | 7~20 | 16 | O | O |
| Time domain resource assignment | 0,1,2,3,4 | 1 | O | O |
| VRB-to-PRB mapping | 0 or 1 | 0 | | |
| PRB bundling size indicator | 0 or 1 | 0 | | |
| Rate matching indicator | 0, 1, or 2 | 0 | | |
| ZP CSI-RS trigger | 0, 1, or 2 | 0 | | |
| Modulation and coding scheme | 5 | 5 | O | |
| New data indicator | 1 | 1 | X | |
| Redundancy version | 2 | 2 | O | |
| Modulation and coding scheme | 5 | 0 | | |
| New data indicator | 1 | 0 | | |
| Redundancy version | 2 | 0 | | |

FIG. 4B

Table 0-3: DCI format 1-0 (Continued)

| Information | Bit Length | Bit width | Fixed in DCI | Known bit |
|---|---|---|---|---|
| HARQ process number | 4 | 4 | X | |
| Downlink assignment index | 0 or 2 or 4 | 0 | | |
| TPC command for scheduled PUCCH | 2 | 2 | O | O |
| PUCCH resource indicator | 3 | 3 | O | O |
| PDSCH-to-HARQ_feedback timing indicator | 0, 1, 2, or 3 | 3 | O | O |
| Antenna port(s) | 4, 5, or 6 | 4 | O | O |
| Transmission configuration indication | 0 or 3 | 0 | | |
| SRS request | 2 or 3 | 2 | O | O |
| CBG transmission information (CBGTI) | 0, 2, 4, 6, or 8 | 0 | | |
| CBG flushing out information (CBGFI) | 0 or 1 | 0 | | |
| DMRS sequence initialization | 1 | 1 | O | O |
| | | 45 | 40 | 33 |

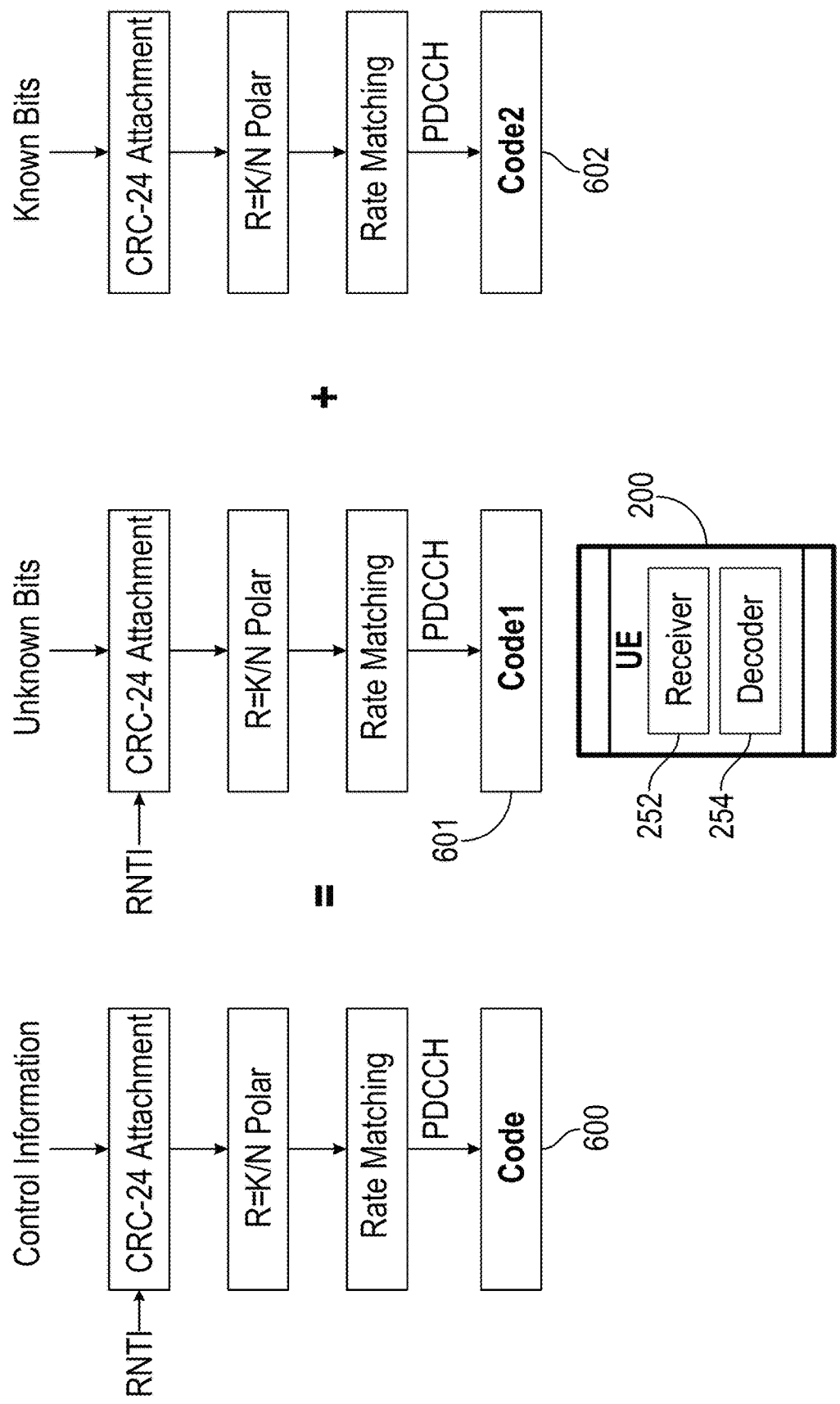

FIG. 10

Table 1: Operations of the Soft-Decision Viterbi Algorithm

| Steps | Operations |
|---|---|
| Initialization: (stage $t = 0$) | - $\Phi_0(0) = 128$, $\Phi_0(i) = 0$, otherwise <br> - $\lambda_0 = 0$ |
| Recursion: ($1 \leq t < T$) | - $\Phi_t(i) = \max_{j \in J_{i,t}}[\Phi_{t-1}(j) + \alpha M_t(j,i)]$ <br> - $\xi_t(i) = \arg\max_{j \in J_{i,t}}[\Phi_{t-1}(j) + \alpha M_t(j,i)]$, $1 \leq i \leq S$. |
| Termination: (stage $t = T$) | - $\Phi_T(0) = \max_{j \in J_{0,T-1}}[\Phi_{T-1}(j) + \alpha M_T(j,0)]$ <br> - $\xi_T(0) = \arg\max_{j \in J_{0,T-1}}[\Phi_{T-1}(j) + \alpha M_T(j,0)]$ |
| Path Trace-back | - $i_T = 0$ (zero-termination) <br> - $i_t = \xi_{t+1}(i_{t+1})$ for $1 \leq t \leq T-1$, starting from step $t = T-1$, the ML state sequence is $(0, i_1, i_2, \ldots, i_{T-2}, i_{T-1}, 0)$ |

PDCCH DECODING WITH KNOWN DCI BITS

CROSS-REFERENCE TO RELATED APPLICATION(S)

This application claims priority to, and benefit of, U.S. Provisional Application Ser. No. 63/314,920, filed on Feb. 28, 2022, entitled "PDCCH DECODING WITH KNOWN DCI BITS FOR LTE AND NR," the entire content of which is incorporated herein by reference.

FIELD

One or more aspects of embodiments according to the present disclosure relate to methods, devices, and systems for decoding wireless communications.

BACKGROUND

The present background section is intended to provide context only, and the disclosure of any embodiment or concept in this section does not constitute an admission that said embodiment or concept is prior art.

In the field of wireless communications, a user equipment (UE) may receive a Physical Downlink Control Channel (PDCCH), which carries scheduling and other control information in the form of a downlink control information (DCI) (e.g., a DCI message). The UE may use the DCI for uplink and downlink data transmissions. For example, a base station (e.g. a gNB or gNodeB) may transmit the DCI to the UE. The UE may use the DCI to transmit uplink data and receive data.

The DCI may be encoded prior to transmission from a base station, and the UE may receive and decode the DCI.

Accordingly, there is a need for methods, devices, and systems for improved PDCCH decoding.

SUMMARY

Aspects of embodiments of the present disclosure relate to wireless communications, and provide improvements to decoding.

According to some embodiments of the present disclosure, there is provided a method of decoding, the method including receiving, by a user equipment (UE), a downlink control information (DCI) that is encoded, identifying, by the UE, a first bit position of the DCI as a known bit, and reducing a number of candidate code words for the DCI based on the known bit.

The identifying the first bit position of the DCI as a known bit may include decoding a first previous DCI by applying no known bit assumptions, decoding a second previous DCI by applying no known bit assumptions, and determining that the first bit position has a value that is the same in the first previous DCI and the second previous DCI.

The method may further include decoding the DCI by treating the first bit position as a known bit, failing to successfully decode the DCI, and decoding the DCI without treating the first bit position as a known bit.

The method may further include decoding a full set of an aggregation level (AL) of the DCI without treating any bit positions of the full set as a known bit, failing to successfully decode the DCI, and decoding the DCI by treating the first bit position as a known bit, the first bit position corresponding to a subset of the AL that matches with a previous successfully decoded DCI.

The method may further include decoding the DCI according to a successive cancellation list decoding method, wherein the UE is configured to treat, as a special node, a node having the known bit as a leaf node.

The method may further include using $$PM_{2^{n-d_v}-1}$$

as a path metric for the special node, wherein $$PM_{2^{n-d_v}-1} = \frac{1}{2} \sum_{k=0}^{2^{n-d_v}-1} |\alpha_i| - \eta_i \alpha_i,$$

and wherein $\eta_i$ is $1-2\beta_i$, $\beta_i$ being an i-th bit of a group of frozen bits and known bits at leaves of a special node, n is a sign (+1 or −1) representation for a bit value (0 or 1) of $\beta_i$, $d_v$ is a level of the special node in a binary tree representation, and $\alpha i$ is a value of the i-th position of an incoming log likelihood ratio (LLR) vector $\alpha_v$ for a node v.

The method may further include decomposing an encoded code word into a first linear component code word and a second linear component code word.

The method may further include descrambling, by the UE, a channel log likelihood ratio (LLR) by the second linear component code word to produce a first descrambled output, decoding, by a decoder of the UE, the DCI by using the first descrambled output as an input to the decoder to produce a first decoder output, scrambling, by the UE, the first decoder output by the second linear component code word to produce a full decoder output including an original code including the first linear component code word and the second linear component code word, performing a radio network temporary identifier (RNTI) de-masking operation on a last sixteen CRC bits of the original code, and performing, by the UE, a cyclic redundancy code (CRC) check on the decoder output based on the performing of the RNTI de-masking operation.

The first linear component code word may be the result of encoding a data word having a zero at the first bit position, the first bit position being a known bit position or an original frozen bit position and an unknown bit at a second bit position, and an unknown bit at a second bit position, the second bit position being an unknown bit position, and the first bit position is labeled as a frozen bit for a decoder.

The second linear component code word may be the result of encoding a data word having the known bit at the first bit position and a zero at an unknown bit position.

The method may further include pruning an invalid candidate code word path based on the invalid candidate code word path being inconsistent with the known bit.

According to other embodiments of the present disclosure, there is provided a user equipment (UE) including a processing circuit and being configured to perform a method of decoding, the method including receiving, by a user equipment (UE), a downlink control information (DCI) that is encoded, identifying, by the UE, a first bit position of the DCI as a known bit, and reducing a number of candidate code words for the DCI based on the known bit.

The identifying the first bit position of the DCI as a known bit may include decoding a first previous DCI by applying no known bit assumptions, decoding a second previous DCI by applying no known bit assumptions, and determining that the first bit position has a value that is the same in the first previous DCI and the second previous DCI.

The method may further include decoding the DCI by treating the first bit position as a known bit, failing to successfully decode the DCI, and decoding the DCI without treating the first bit position as a known bit.

The method may further include decoding a full set of an aggregation level (AL) of the DCI without treating any bit positions of the full set as a known bit, failing to successfully decode the DCI, and decoding the DCI by treating the first bit position as a known bit, the first bit position corresponding to a subset of the AL that matches with a previous successfully decoded DCI.

The method may further include decoding the DCI according to a successive cancellation list decoding method, wherein the UE is configured to treat, as a special node, a node having the known bit as a leaf node.

The method may further include decomposing an encoded code word into a first linear component code word and a second linear component code word.

The method may further include descrambling, by the UE, a channel log likelihood ratio (LLR) by the second linear component code word to produce a first descrambled output, decoding, by a decoder of the UE, the DCI by using the first descrambled output as an input to the decoder to produce a first decoder output, scrambling, by the UE, the first decoder output by the second linear component code word to produce a full decoder output including an original code including the first linear component code word and the second linear component code word, performing a radio network temporary identifier (RNTI) de-masking operation on a last sixteen CRC bits of the original code, and performing, by the UE, a cyclic redundancy code (CRC) check on the decoder output based on the performing of the RNTI de-masking operation.

The method may further include pruning an invalid candidate code word path based on the invalid candidate code word path being inconsistent with the known bit.

According to other embodiments of the present disclosure, there is provided a user equipment (UE) including a means for processing and being configured to perform a method of decoding, the method including receiving, by the UE, a downlink control information (DCI) that is encoded, identifying, by the UE, a first bit position of the DCI as a known bit, and reducing a number of candidate code words for the DCI based on the known bit.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 1 is a flowchart depicting a PDCCH encoding processes for Long Term Evolution (LTE) and New Radio (NR), according to some embodiments of the present disclosure;

FIG. 2 is a table listing Radio Network Temporary Identifier (RNTI), search space, DCI format, and usage information for PDCCH, according to some embodiments of the present disclosure;

FIG. 3 is a table listing size and usage information for DCIs according to the DCI format and scrambled RNTI, according to some embodiments of the present disclosure;

FIG. 4A is a table listing the contents of DCI format 1-0 with a size of 45, according to some embodiments of the present disclosure;

FIG. 4B is a continuation of the table of FIG. 4A listing the content of DCI format 1-0 with size of 45, according to some embodiments of the present disclosure;

FIG. 6 is a flowchart depicting a NR PDCCH polar code decomposition process, according to some embodiments of the present disclosure;

FIG. 10 is a table summarizing a soft-decision Viterbi algorithm, according to some embodiments of the present disclosure;

Figure 5A:
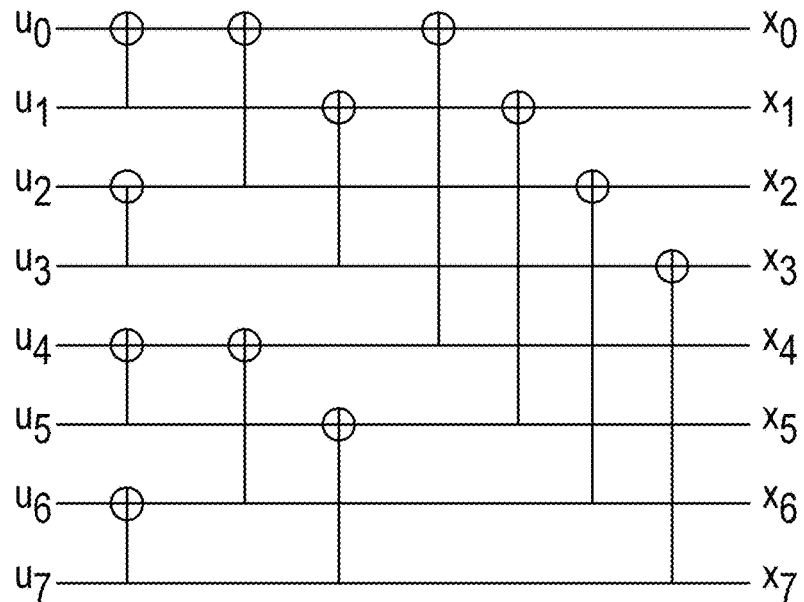
FIG. 5A, FIG. 5B, and FIG. 5C (collectively, FIG. 5) are diagrams depicting an eight-bit polar encoding process, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, in the figures may be exaggerated relative to other elements to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, and/or sections, these elements, components, and/or sections should not be limited by these terms. These terms are used to distinguish one element, component, or section from another element, component, or section. Thus, a first element, component, or section described below could be termed a second element, component, or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of wireless communications, a UE may receive a PDCCH, which carries scheduling and other control information in the form of a DCI. The UE may use the DCI for uplink and downlink data transmissions. For example, a base station (e.g. a gNB or gNodeB) may transmit the DCI to the UE. The UE may use the DCI to transmit uplink data and receive data. The DCI may be encoded prior to transmission from the base station, and the UE may receive and decode the DCI. As used herein, "decoding a DCI" (when used without qualifiers, such as "successfully") means attempting to decode the DCI by performing a decoding operation.

FIG. 1 is a flowchart depicting a PDCCH encoding processes for LTE and NR, according to some embodiments of the present disclosure.

Referring to FIG. 1, a Long Term Evolution (LTE) PDCCH encoding process 1400 and a New Radio (NR)

PDCCH encoding process 1500 are shown. In fourth generation Long Term Evolution (4G/LTE) and fifth generation New Radio (5G/NR) wireless systems, a PDCCH transmits DCIs that contain control information 1002 for one or multiple UEs 200. The control information 1002 is encoded by a cyclic redundancy code (CRC) 1004 and then the last 16 bits from the CRC encoding output are scrambled with the corresponding Radio Network Temporary Identifier (RNTI) 1006 of the UE 200. The RNTI-scrambled sequence 1008 is then either encoded by a rate ⅓ tail biting convolutional code (TBCC) 1410 in the case of the LTE PDCCH encoding process 1400, or encoded by a rate K/N polar code 1510 in the case of the NR PDCCH encoding process 1500, where K is the combined length of (i) the original DCI bit sequence and (ii) the CRC bits, and N is the mother block length of the polar code. The TBCC-encoded bit sequence 1412 or the polar-encoded bit sequence 1512 further go through the rate matching process 1014 to generate the final PDCCH bit sequence 1016 for transmission.

The size of the DCI will be dependent on the transmission bandwidth, the number of antennas, etc. The UE may be capable of decoding (e.g., successfully decoding) the DCI without utilizing any a priori knowledge (e.g., without any prior knowledge or without any deduced knowledge). In some scenarios, however, certain bits in the DCI may be known a-priori, and proper utilization of known bits may improve decoding performance.

In soft decoding, a priori probabilistic measures may be applied to known bits to assist in decoding. For example, probabilistic measures may be used to represent known information for decoding. However, such measures may still result in uncertainties in selecting candidate code words. Furthermore, when conventional a priori probabilistic measures are applied to 5G PDCCH, simplified successive cancellation (S-SC) polar decoding algorithms may not be directly applied. Accordingly, there is a need for improved decoding of DCIs for 4G/LTE PDCCH and 5G/NR PDCCH.

Aspects of embodiments of the present disclosure provide methods, devices, and systems for: (1) identifying known DCI bits prior to PDCCH decoding; and (2) utilizing known DCI bits in PDCCH decoding. For example, the present disclosure provides methods of utilizing the known DCI bits in PDCCH decoding for 4G/LTE and for 5G/NR.

For LTE, as discussed further below, a decoder 254 may prune invalid candidate paths that contradict known DCI bit information during decoding. For NR, as discussed further below, two methods may be utilized for CRC-aided simplified successive cancellation list (CA-SSCL) decoding algorithms. The methods may be extended (e.g., applied) to other successive cancellation (SC) based decoding algorithms as well. In a first method, definitions of special nodes may be modified to accommodate known bits. In a second method, to maintain the original definitions of the special nodes, a linear decomposition of polar encoding and CRC encoding may be applied.

Aspects of embodiments of the present disclosure apply hard decisions as to known DCI bit values in the decoder 254. Accordingly, uncertainty in candidate code words with regard to the known DCI bits may be reduced (e.g., completely removed). The present disclosure also provides direct and simple application for S-SC polar decoding algorithms.

Aspects of embodiments of the present disclosure may yield advantages and improvements over conventional PDCCH decoding approaches, by providing: mechanisms enabling known bit identification; and methods for implementing novel special node definitions in 5G polar code structures to utilize known DCI bits. In some embodiments, S-SC decoding algorithms or simplified successive cancellation list (S-SCL) decoding algorithms may be utilized directly. (Conventional decoding approaches may not directly utilize an S-SC or an S-SCL decoder.)

In some embodiments, for 5G PDCCH, the UE 200 may perform a combination of linear and non-linear decomposition of an originally transmitted polar code word into two code words. For example, one of the two code words may be coded with only known information that does not need decoding, and the other code word of the two code words may be coded with unknown DCI bits that may be decoded by a polar decoder.

In some embodiments, for 4G PDCCH, the UE 200 may perform explicit pruning of invalid candidate code words according to (e.g., based on) known DCI bits.

Accordingly, aspects of embodiments of the present disclosure may provide for novel, low complexity 4G and 5G PDCCH decoders with improved performance. In summary, the present disclosure provides for a decoder 254 (e.g., a PDCCH decoder) that may utilize known DCI bits with different options. 5G/NR PDCCH transmissions and 4G/LTE PDCCH transmissions are respectively discussed in more detail below.

DCI Known Bit Identification

In both 4G/LTE PDCCH decoding and 5G/NR PDCCH decoding, a UE 200 may decode candidate DCIs with certain formats in certain search spaces of the PDCCH.

FIG. 2 is a table (Table 0-1) listing RNTI, search space, DCI format, and usage information for PDCCH, according to some embodiments of the present disclosure.

Referring to FIG. 2, Table 0-1 shows how DCI contents may depend on DCI format and RNTI. Accordingly, a UE may perform known DCI bit identification for each DCI format and RNTI separately. The size of the DCI may depend on transmission bandwidth, number of antennas, etc.

FIG. 3 is a table (Table 0-2) listing size and usage information for DCIs according to the DCI format and scrambled RNTI, according to some embodiments of the present disclosure.

Referring to FIG. 3, Table 0-2 shows DCI format information for NR PDCCH. The minimum and maximum size of each DCI format may depend on resource block (RB) number and radio resource control (RRC) configurations.

FIG. 4A is a table listing the contents of DCI format 1-0 with a size of 45, according to some embodiments of the present disclosure. FIG. 4B is a continuation of the table of FIG. 4A listing the content of DCI format 1-0 with size of 45, according to some embodiments of the present disclosure.

Referring to FIG. 4A and FIG. 4B, Table 0-3 shows the content of DCI format 1-0 with a size (e.g., a bit width) of 45 DCI bits. Among the total of 45 DCI bits, certain bit fields (e.g., DCI bit fields) may be considered to be known, and Table 0-3 shows a case in which 33 bits are considered to be known. Referring to the "Fixed in DCI" column of FIGS. 4A and 4B, "Fixed in DCI" means that, in some trials, values of some DCI bit fields were empirically observed to change during an observed window of time. "X" means a corresponding DCI bit field changed during the trial, and "O" means a corresponding DCI bit field did not change. Referring to the "Known bit" column of FIGS. 4A and 4B, the following DCI bit fields (marked with an "O"), for example, may be considered to be known: (referring to FIG. 4A) an identifier for DCI formats field, which may have a bit width of 1; a frequency domain resource assignment field, which may have a bit width of 16; a time domain resource assignment field, which may have a bit width of 1; (referring to FIG. 4B) a transmit power control (TPC) command for scheduled Physical Uplink Control Channel (PUCCH) field, which may have a bit width of 2; a PUCCH resource indicator field, which may have a bit width of 3; a Physical Downlink Shared Channel-to-Hybrid Automatic Repeat Request (PDSCH-to-HARQ) feedback timing indicator field, which may have a bit width of 3; an antenna port field, which may have a bit width of 4; a Sounding Reference Signal (SRS) request field, which may have a bit width of 2; and a demodulation reference signal (DMRS) sequence initialization field, which may have a bit width of 1.

In some embodiments, a more conservative assumption of known bits may be used to increase usability in more general scenarios (at the expense of reducing some aspects of performance). For example, even though a modulation and coding scheme field and a redundancy version field may not change during a particular window of time, these fields may be less likely than other unchanged fields to stay the same in most cases. Accordingly, the modulation and coding scheme field and the redundancy version field may not be assumed to be known bits.

In some embodiments, a UE may perform known DCI bit identification after first successfully decoding several DCIs without assuming that any bits are known. If it is then determined that certain bit fields do not change, or change rarely, these bits may be treated as known bits. For example, if a UE decodes two consecutive DCIs and observes that some bit fields do not change, then it may consider those fields to be known. In some circumstances, some bit fields may remain unchanged for a long time, for example, because certain scheduling parameters may not need to change if a UE is in a stable environment with little congestion of the medium.

In some embodiments, the aforementioned successful decoding of several DCIs without assuming that any bits are known may be performed, by the UE, at some initial stage, and the bits that are identified, as a result, as known bits (e.g., the bits that are assumed to be known bits), may then be used when decoding subsequently received DCIs. In some embodiments, such known bit assumptions may be further modified depending on whether or not their values change as further DCIs are decoded.

For example, once an initial set of known bits (e.g., known bit positions) is determined, the UE may apply the corresponding known bit assumptions to decode a DCI. Each time the UE successfully decodes a DCI, the UE may re-assess whether other bit positions may be classified as known bits, for example, when the value in a bit position has not changed over some number of consecutive DCIs (even if it has changed in earlier DCIs). In some embodiments, the UE may also change some of the positions considered to be (e.g., deemed to be) known bits to be unknown if those positions are confirmed to be changing in a series of successfully decoded DCIs. This approach, however, may result in performance degradation in 4G and 5G systems because the UE may fail at DCI decoding (e.g., the UE may fail to successfully decode a DCI) if it assumes certain bit fields are known when in fact they have changed. In this case, the UE may not be able to compare bit fields (e.g., bit positions) to determine whether a particular position includes known or unknown DCI bits, unless, for example, it makes an additional decoding attempt without assuming that any bits are known.

As described above, known bit assumptions at a UE side may incur a performance degradation if they are incorrect, e.g., if the bit values in such assumed known bit positions later change. Thus, it may be advantageous to prevent such a performance degradation. In some embodiments, the UE may continuously monitor DCI delivery patterns from the network and may determine that some bits have been incorrectly classified as known bits, when it observes that it suddenly successfully decodes considerably fewer DCIs in a given time compared with a given time in the past. For example, the UE may make such a determination when a number of DCIs it receives and successfully decodes in a most recent period of time (e.g., 100 ms) is less than a previous average (e.g., an average determined over a 10 s duration divided into 100 ms windows) by a certain offset (e.g., a certain threshold). The known bit assumptions that were most recently used by the UE in an attempt to decode a DCI may be referred to as the "current" known bit assumptions. In some embodiments, when the UE determines that some bits have been incorrectly classified as known bits, the UE may, instead of applying the current known bit assumptions, apply fewer or no known bit assumptions to decode DCIs to identify a potentially reduced number of known bit positions.

In some embodiments, the UE may apply fewer or no known bit assumptions to decode DCIs for certain periods of time to identify a different, potentially smaller, set of known bit positions. For example, the UE may decode DCIs (e.g., attempt to successfully decode DCIs) with fewer or no known bit assumptions for the decoding of one DCI every 10 ms, and the time interval between such decodings (with fewer or no known bit assumptions (e.g., 10 ms) may also adaptively change. For example, the UE may switch from the current known bit assumptions to applying fewer or no known bit assumptions periodically to determine whether a number of successfully decoded DCIs in a given time period increases. However, such an approach may still incur performance degradation during the period of time before the UE confirms that the number of known bits is reduced.

To prevent performance degradation during the period of time before the UE confirms that the number of known bits is reduced, a few methods may be considered. For example, in some embodiments, a combination of the following two operations may be utilized: (1) decoding by applying fewer or no known bit assumptions (operation 1); and (2) decoding with the current known bit assumptions (operation 2).

The ordering of the two operations (e.g., operation 1 first and then operation 2, or vice versa) may be selected depending on a likelihood of success of each operation. For example, if one operation exhibits a greater likelihood of success, then that operation may be performed first. For example, the UE may identify that a number of DCIs it received and successfully decoded in a most recent period of time is less than a previous average by a certain offset. The UE may determine that decoding by applying fewer or no known bit assumptions (operation 1) has a higher likelihood of success than decoding with the current known bit assumptions. Thus, the UE may decode by applying fewer known bit assumptions (operation 1) and determine whether the number of DCIs it receives and successfully decodes in a most recent period of time improves (e.g., increases). If the number of DCIs the UE receives and successfully decodes in the most recent period improves to an acceptable amount, the UE may decode with the current known bit assumptions (operation 2) or by applying even fewer known bit assumptions (operation 1) to determine whether a further improvement may be achieved. If, on the other hand, the number of DCIs the UE receives and successfully decodes does not improve (or does not improve sufficiently), the UE may decode by applying even fewer known bit assumptions (operation 1).

In some embodiments, and in some situations, a UE may apply only operation 1 or only operation 2 to reduce complexity. For example, in some embodiments, a UE may decode by applying fewer known bit assumptions (operation 1) and determine that the number of DCIs the UE receives and successfully decodes in the most recent period improves to an acceptable amount. The UE may then decode subsequent DCIs with the current known bit assumption (operation 2) and not attempt to decode by applying even fewer known bit assumptions (operation 1) to determine whether a further improvement may be achieved. Thus, in a situation following operation 1, where the UE may apply either operation 1 or operation 2, the UE may apply only operation 2 to reduce complexity.

In some embodiments, a set of candidates (e.g., a range of candidate lengths and formats for the decoding of a DCI) for performing either of the above operations, or for performing both operations with certain ordering, may be adjusted. For example, either operation 1 or operation 2, or both, may be applied on either a full set of candidates or a subset of candidates. Furthermore, choosing the full set of candidates or the subset of candidates may depend on a likelihood of success. For example, a UE may apply operation 1 or operation 2, or both, on the full set if the likelihood of success is greater than applying operation 1 or operation 2, or both, on the subset. In some embodiments, a UE may apply operation 1 on a full set and operation 2 on a subset based on determining that applying operation 1 on a full set is more robust. In some embodiments, the selection of the subset may be determined by characteristics such as aggregation level (AL) (e.g., a number of control channel elements allocated for a PDCCH), search space type (e.g., common search space or UE-specific search space), DCI format, or the like.

In some embodiments, a UE's selection of the subset may be based on a likelihood of success. For example, the likelihood of success may be considered to be high if the AL matches a previous successfully decoded DCI. For example, a UE may consider a subset having an AL matching a previous successfully decoded DCI subset's AL to be a subset having a high likelihood of success. In some embodiments, a UE may decode with current known bit assumptions by first applying the known bit assumptions on a subset of an AL that matches with the previous successfully decoded DCIs, and, only when the decoding fails, the UE may further decode by applying fewer or no known bit assumptions on the full set of the AL. In some embodiments, a UE may first decode a full set of an AL with no known bit assumptions. If decoding fails, the UE may decode by applying the known bit assumptions on a subset of an AL that matches with a previous successfully decoded DCI.

5G/NR PDCCH Decoder with Known DCI Bits

Baseline CA-SSCL Polar Decoder Design

The symbol $G_N = (G_2)^{\otimes n}$ may be used to denote the n-th Kronecker power of matrix $G_2$, where $$G_2 = \begin{bmatrix} 1 & 0 \\ 1 & 1 \end{bmatrix}.$$

For a code with length N, the output after polar encoding $d=[d_0 d_1 d_2 \ldots d_{N-1}]$ may be obtained by equation (0-1), where u is a length N sequence composed of frozen bits (e.g., bit positions having values that are fixed) and information bits (e.g., bit positions having values that are not fixed).

$$d = u G_N \qquad (0\text{-}1)$$

In some embodiments, a baseline decoder algorithm may be a CA-SSCL algorithm. The simplification of the CA-SSCL may be based on special nodes as defined below.

Figure 5B:
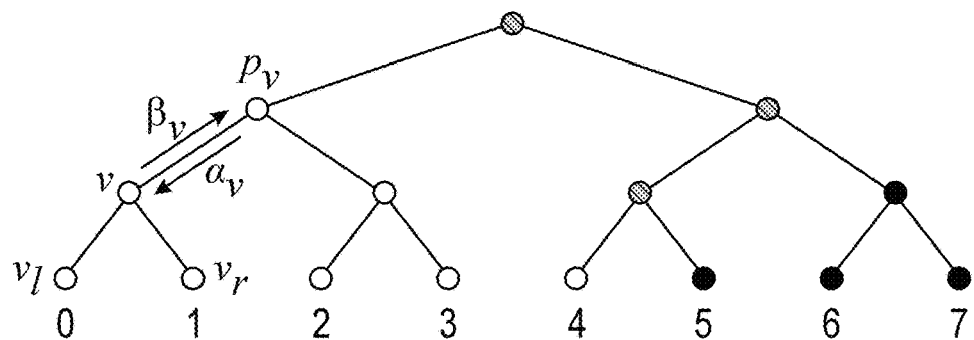
Figure 5C:
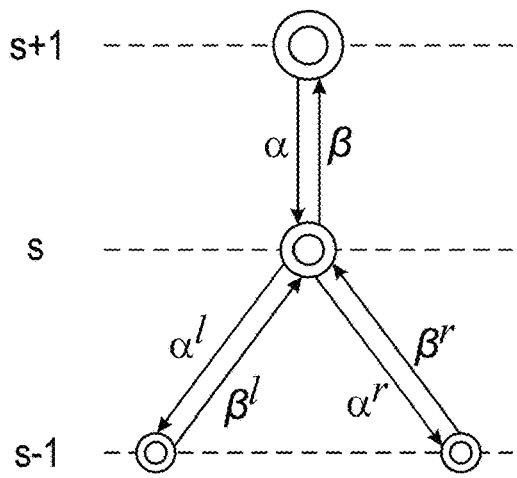

FIG. 5A, FIG. 5B, and FIG. 5C (collectively, FIG. 5) are diagrams depicting an eight-bit polar encoding process, according to some embodiments of the present disclosure.

Referring to FIG. 5, conventional successive cancellation (SC) decoding may be represented by a full binary tree of depth n, i.e., a binary tree with $2^n$ leaves, each having depth n. FIG. 5 shows the eight-bit polar encoding process (FIG. 5A) with its binary tree structure (FIG. 5B) and a node structure with decoding message passing directions (FIG. 5C).

Given a node v, its depth, parent node, and left and right child nodes may be represented by $d_v$, $p_v$, $v_l$ and $v_r$, respectively. $\alpha_v$ may be the incoming log likelihood ratio (LLR) vector for node v, while $\beta_v$ may contain the hard decisions on bits at node v. $V_v$ may be the set of nodes of the subtree rooted at node v and $l(v)$ may be the index of a leaf node v. For each node v, the following set $$I_v = \{l(u) : u \in V_v \text{ and } u \text{ is a leaf node}\} \qquad (0\text{-}2)$$

may contain the indices of all leaf nodes that are descendants of node v. A may be the information set of a given polar code. A node v may be a rate-1 node with respect to A if $I_v \in A$, i.e., if the leaf nodes that are descendants of node v are all information bits. A node v may be a rate-0 node with respect to A if $I_v \notin A$, i.e., if the leaf nodes that are descendants of node v are all frozen bits. A node v may be a repetition node if the leaf nodes that are descendants of node v are partially information bits and partially frozen bits. In the repetition node, only the last leaf node may be an information bit and the other leaves may be frozen bits. All bits in the codeword $\beta_v$ of node v may have the same value as the information bit of the last leaf node. In FIG. 5B, the rate-0 node is a white circle, the rate-1 node is a black circle and the repetition node is a gray circle with lines. Further, a single parity check (SPC) node may be defined for nodes having information bits for all the descendant leaf nodes, except for the first leaf node. In FIG. 5B, the right child from the root may be a SPC node.

CA-SSCL may allow a maximum L candidate paths (denoted by CA-SSCL-L).

For path l, the path metric for a rate-0 node of length $2^{n-d_v}$ may be calculated as $$PM_{2^{n-d_v}-1,l} = \frac{1}{2} \sum_{i=0}^{2^{n-d_v}-1} |\alpha_{i,l}| - \alpha_{i,l} \qquad (0\text{-}3)$$

The path metric for a rate-1 node of length $2^{n-d_v}$ may be calculated as $$PM_{2^{n-d_v}-1,l} = \frac{1}{2} \sum_{i=0}^{2^{n-d_v}-1} |\alpha_{i,l}| - \eta_{i,l} \alpha_{i,l} \qquad (0\text{-}4)$$

where $\eta_{i,l}$ is $1-2\beta_{i,l}$. For the rate-1 node, list candidate selection may be considered to avoid evaluating a total of $2^{n-d_v} \cdot L$ path matrices.

For a repetition node of length $2^{n-d_v}$, the path metric may be calculated as $$PM_{2^{n-d_v}-1,l} = \frac{1}{2}\sum_{i=0}^{2^{n-d_v}-1} |\alpha_{i,l}| - \eta_l \alpha_{i,l} \qquad (0\text{-}5)$$

where $\eta_l$ is 0 or 1.

For list decoding, path metrics (PMs) may be calculated for $\eta_l$ of both 0 and 1 and L candidates may be selected.

For a SPC node, the path metric may be:

$$PM_{2^{n-d_v}-1,l} = \frac{1}{2}\sum_{i=0}^{2^{n-d_v}-1} |\alpha_{i,l}| - \eta'_{i,l}\alpha_{i,l} \qquad (0\text{-}6)$$

where $\eta'_{i,l}$ is $1-2\beta_{i,l}$ with $$(\beta_{0,l}, \beta_{1,l}, \ldots, \beta_{2^{n-d_v}-1,l})$$

satisfying the even parity constraint, i.e., $$\beta_{0,l} \oplus \beta_{1,l} \oplus \ldots \oplus \beta_{2^{n-d_v}-1,l} = 0.$$

CA-SSCL Polar Decoder Design with Known DCI Bits

Known DCI bits, if any, may assist decoding in a manner that is similar to how frozen bits may assist decoding. The only difference is that, while frozen bits may be preset to be zeros, known bits may be either 1 or 0. As a result, the original CA-SSCL algorithm may not be used directly after marking known bit indices. Aspects of embodiments of the present disclosure provide the following two methods to address this issue.

Method 1: Modified Definition and Path Metric Update for Special Nodes

To accommodate "frozen bits" with non-zero positions, the rate-0 node may be modified to be defined as a node for which all leaf nodes that are either frozen bits or known bits. The rate-0 node may be at the $d_v$-th level of the binary tree, and the path metric for such a node may be modified as:

$$PM_{2^{n-d_v}-1,l} = \frac{1}{2}\sum_{i=0}^{2^{n-d_v}-1} |\alpha_i| - \eta_i \alpha_i$$

where is $1-2\beta_i \cdot \beta_i$ is the i-th bit of the group of the frozen bits and known bits at the leaves of this special node, which may be obtained by encoding, using a regular Kronecker product, the frozen bits and known bits at the leaves of this special node. n is a sign (+1 or −1) representation for a bit value (0 or 1) of $\beta_i$. $d_v$ is the level of this special node in the binary tree representation like FIG. 5B. $\alpha_i$ is the value of the i-th position of the incoming log likelihood ratio (LLR) vector $\alpha_v$ for node v.

The rate-1 node may be defined as a node for which all leaf nodes that are information bits and not known bits.

Here, the path metric may remain the same as in the original simplified successive cancellation list (SSCL). The repetition node may be defined as a node for which the last leaf is the information bits and the not known bits, and the rest are frozen bits. Here, the path metric remains the same as in the original SSCL. The SPC node may be defined as a node for which the first leaf is frozen bits, and the rest are information bits and not known bits. Here, the path metric remains the same as in the original SSCL.

In the above definitions, the repetition node and the SPC node are the same as those defined in the original SSCL decoding algorithm. However, in some embodiments, the repetition node and the SPC node may be modified in a manner similar to the manner in which the rate-0 node is modified to treat frozen bits and known information bits the same way. Further, the corresponding path metrics may apply sub-code encoding to account for contributions from non-zero known bits. The above definitions illustrate one specific example of modified special nodes whereby the current CA-SSCL decoder implementation may be utilized by only correspondingly changing the path metrics.

Method 2: Decompose the Code Word into Two Linear Components

During the NR PDCCH encoding process, both polar encoding and CRC encoding are linear encoding processes, while the RNTI masking on the CRC bits is not linear. Therefore, the known bits may be utilized by decomposing the original code word into two linear component code words, without modifying the definition of special nodes.

FIG. 6 is a flowchart depicting a NR PDCCH polar code decomposition process, according to some embodiments of the present disclosure.

Referring to FIG. 6, if the CRC bits do not go through 16-bit RNTI masking, the original CRC-polar encoded code word 600 may be decomposed into a first code 601 (e.g., Code 1) and a second code 602 (e.g., Code 2) as follows. Code 1: CRC and polar encoded from unknown bits only, known bits may be set to zero and labeled as frozen bits. Code 2: CRC and polar encoded from known bits only, unknown bits may be set to zero. For example, Code 1 may be the result of performing CRC encoding followed by polar encoding on a data word (e.g., an unencoded data word) that has the values of the unknown bits at the unknown bit positions, and zeros in the known bit positions, and Code 2 may be the result of performing CRC encoding followed by polar encoding on a data word that has zeros in the unknown bit positions and the values of the known bits at the known bit positions.

In some real encoding procedures, a RNTI masking of the last 16 CRC bits may be added after CRC encoding and before polar encoding. Accordingly, at a receiver 252 of the UE 200, RNTI de-masking may be performed inside a decoder 254 (e.g., a polar decoder) before CRC checking. Therefore, because CRC bits may be decomposed as crc=crc1⊕crc2, and crc⊕rnti=(crc1⊕rnti)⊕crc2, Code 1 may be modified as CRC encoding→RNTI masking→polar encoded from unknown bits only, setting known bits to zero. Code 2 may remain as only CRC encoding→polar encoding. For example, what is actually transmitted may be in the form of crc⊕rnti (e.g., RNTI masking may be done on CRC). It may be equivalent if such a masking is applied to any of CRC1 or CRC2 after the original CRC is decomposed as crc=crc1⊕crc2. In some embodiments, a decoder operation may handle a situation when this masking is applied to CRC1 due to its easiness. In some embodiments, channel LLRs may first be descrambled by Code 2 including only CRC2 as discussed below, and RNTI de-masking may be handled "after" decoding is done (as RNTI descrambling is normally handled without any known bit assumptions).

In some embodiments, at the receiver 252, the UE 200 may descramble channel LLRs by Code 2. At the same time, the frozen bit set may be expanded to include the known DCI bit positions. Accordingly, definitions of special nodes may remain unchanged. The decoder 254 output bit sequence corresponding to Code 1 may then be descrambled by Code 2 again to obtain the decoder output for the original Code 1+Code 2. UE 200 may perform a CRC check on the decoder output after the RNTI masking operation is performed on the last 16 CRC bits. (Masking may also be thought of as de-masking here due to the fact that the operation is in a binary field and addition and subtraction are the same.)

In other words, the UE 200 may descramble a channel LLR by Code 2 (a second linear component code word) to produce a first descram bled output. The UE 200 may then decode the DCI by using the first descrambled output as an input to the decoder to produce a first decoder output. The UE 200 may then scramble the first decoder output by Code 2 to produce a full decoder output including an original code including Code 1 (a first linear component code word) and Code 2. The UE 200 may then perform a CRC check on the decoder output after performing an RNTI de-masking operation on the last 16 CRC bits. (Due to binary field operation, scrambling and descrambling would technically do the same thing. Accordingly, a scrambling operation may be referred to as a descrambling operation and a descrambling operation may be referred to as a scrambling operation.)

Figure 7:
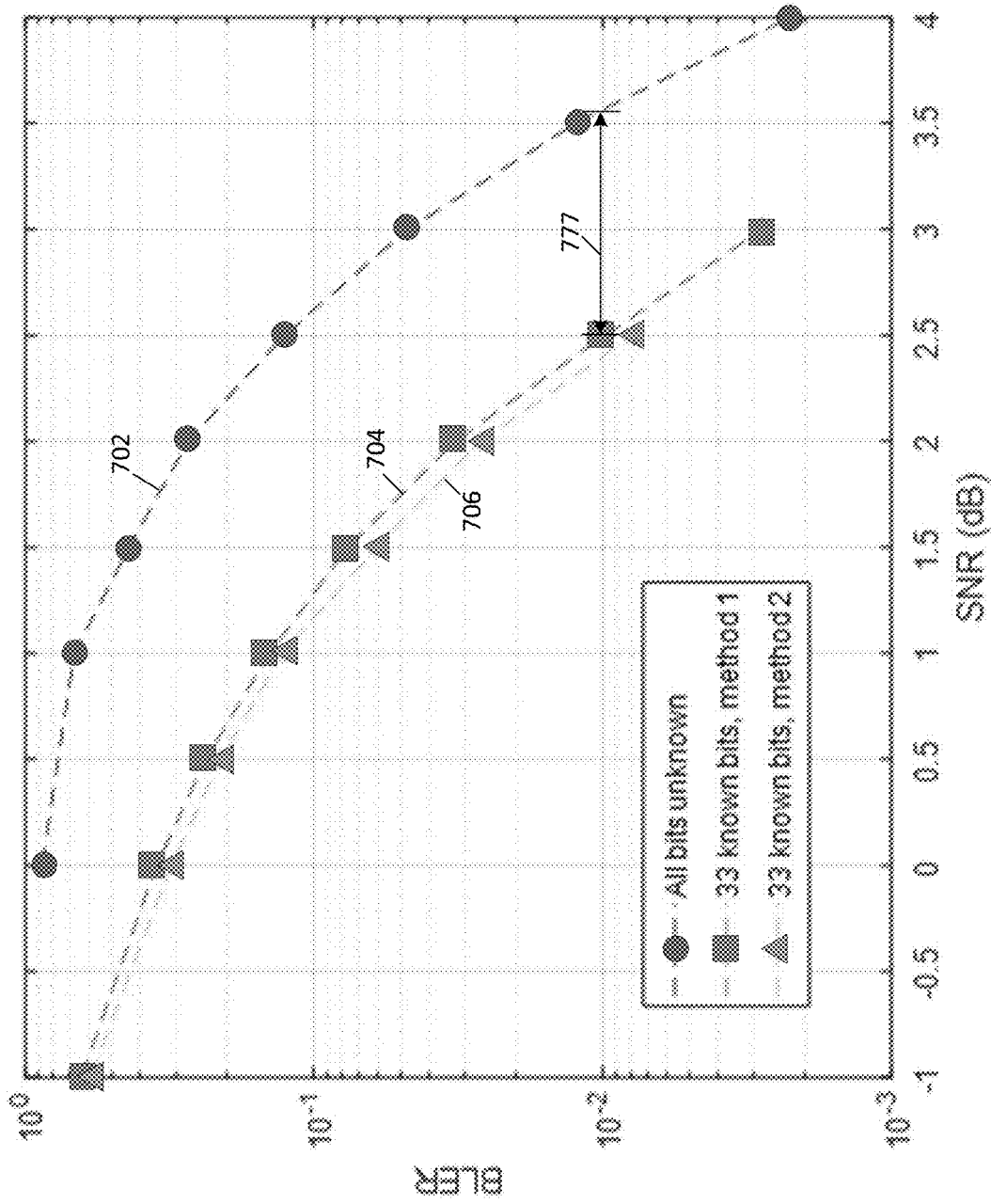
FIG. 7 is a graph comparing a conventional (no known bit) decoding algorithm with two known-bit decoding algorithms, according to some embodiments of the present disclosure.

FIG. 7 is a graph comparing a conventional (no known bit) decoding algorithm with two known-bit decoding algorithms, according to some embodiments of the present disclosure.

Referring to FIG. 7, a simulation performance example for DCI format 1-0, with size 45 is shown. A conventional method 702, which is a CA-SSCL-8 decoding method without utilizing known DCI bits, is compared with two CA-SSCL-8 methods utilizing the known bit methods discussed above. A first method 704 utilizes method 1 discussed above, and a second method 706 utilizes method 2 discussed above.

The conventional method 702, the first method 704, and the second method 706, were tested in an additive white Gaussian noise (AWGN) channel for PDCCH transmission with the DCI format 1-0, discussed above, with a configuration having one transmit antenna and one receive antenna. For the first method 704 and the second method 706, among the total of 45 bits, 33 bits were assumed to be known bits. (The known bit positions were 1:18 and 31:45.) A CA-SSCL decoder having a list size 8 was used.

As can be seen in FIG. 7, a SNR gain 777 (e.g., a shift to the left between the curves) may be achieved by utilizing the known-bit methods according to the present disclosure. For example, the conventional method 702 requires a SNR of about 3.5 dB to achieve a block error rate (BLER) of 1% ($10^{-2}$), while the first method 704 requires only a SNR of about 2.5 dB to achieve the same BLER of 1%. The second method 706 requires less than 2.5 dB to achieve the same BLER of 1%. Accordingly, a UE practicing the first method 704 or the second method 706 may be able to successfully decode DCIs in situations where a UE practicing the conventional method 702 may fail to successfully decode DCIs. For example, a UE practicing the first method 704 or the second method 706 may be able to successfully decode DCIs when it is far away from a base station and signal power is low, while a UE practicing the conventional method 702 at the same distance from the base station may fail to decode.

4G/LTE PDCCH Decoder with Known DCI Bits

Baseline Soft Viterbi Decoder Design

Figure 8:
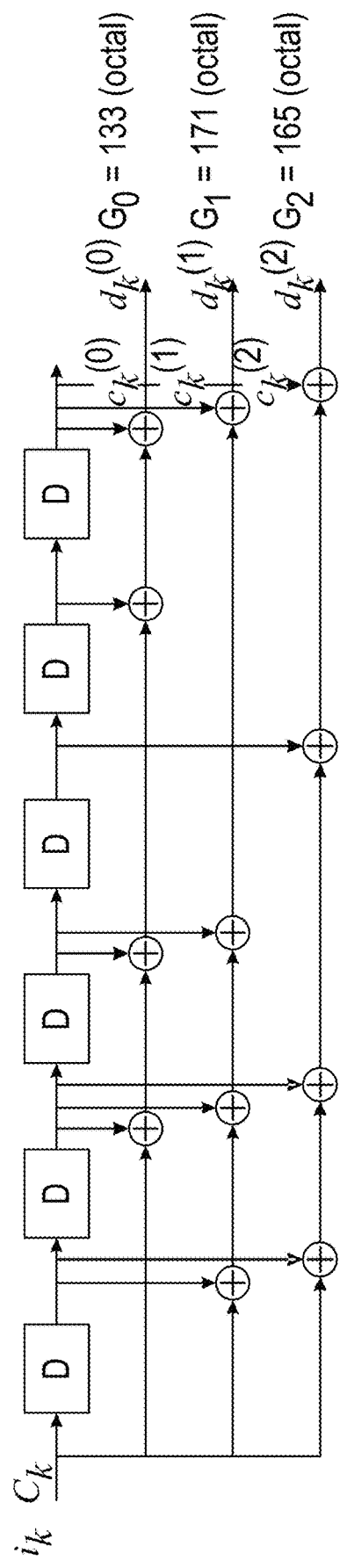
FIG. 8 is a schematic diagram depicting an LTE PDCCH polar code decomposition process (e.g., a tail biting convolutional encoder), according to some embodiments of the present disclosure.

FIG. 8 is a schematic diagram depicting an LTE PDCCH polar code decomposition process (e.g., a tail biting convolutional encoder), according to some embodiments of the present disclosure.

In LTE, a PDCCH may employ a tail-biting convolutional code with a constraint length of 7 and a coding rate of 1/3.

V may be used to denote a message vector, and C may be used to denote the corresponding code vector applied by the encoder to the input of a discrete memoryless channel. R may be used to denote the received vector, which may differ from the transmitted code vector due to channel noise. Given the received vector R, the decoder may make an estimate V of the message vector. An (n,k) convolutional code with a constraint length of m+1 may be assumed. A soft-decision Viterbi decoder is discussed next.

The Viterbi algorithm may return a maximum likelihood (ML) estimate of the message vector V, i.e., for a binary message vector of length K, $$\hat{V}_{ML} = \arg\max_{V \in \{0,1\}^K} p_{R|V}(R \mid V). \tag{0-1}$$

The Viterbi algorithm may return a sequence $\hat{V}_{ML}$ that maximizes the probability of receiving the sequence R given $\hat{V}_{ML}$ was the encoded message vector V. Because there is a one-to-one correspondence between the message vector V and the codeword $\hat{C}_{ML}$, finding the ML codeword is equivalent to finding the ML message $\hat{V}_{ML}$. p(R|C) may be used to denote the conditional probability of receiving the received vector R, given that code vector C was sent, then assuming the de-rate matched codeword length is N=n(K+m), the ML received codeword is then $$\hat{C}_{ML} = \arg\max_{C \in \{0,1\}^N} p(R \mid C). \tag{0-2}$$

In the case of a memoryless channel, p(R|C)=$\Pi_{i=1}^{N}$p$(r_i|c_i)$, the log-likelihood function is $$\log p(R \mid C) = \sum_{i=1}^{N} \log p(r_i \mid c_i). \tag{0-3}$$

An additive white Gaussian noise channel may be assumed, with noise variance $2\sigma^2$, and $p(r_i|c_i)$ may then be $$p(r_i \mid c_i) = \frac{1}{\sqrt{2\pi\sigma^2}} e^{-\frac{(r_i-c_i)^2}{2\sigma^2}}. \tag{0-4}$$

From equations (0-3) and (0-4), log p(R|C) may now be written as, for some constants α, α', β and β', $$\log p(R|C) = -\alpha' \sum_{i=1}^{N}(r_i - c_i)^2 + \beta' \qquad (0\text{-}5)$$
$$= \alpha \sum_{i=1}^{N} r_i c_i + \beta$$
$$= \alpha(R \cdot C) + \beta$$

For a simpler hardware implementation, the path metric may then be the correlation metric, where the accumulated oath metric (APM) may be $$M(R|C) = \sum_{i=1}^{N} M(r_i|c_i), \qquad (0\text{-}6)$$

The individual bit metric may be $$M(r_i|c_i) = r_i c_i \qquad (0\text{-}7)$$

With the correlation metric, the ML path may be the path with the maximum APM. $M_t(j, i)$ may be defined to be the accumulated branch metric (ABM) associated with going from state j at stage t−1 to state i at stage t, by accumulating the n bit metrics, correlating the n received bits at this stage with the n code-bits associated with that branch. $c_i$ may be the coded bits associated with a branch going from state j at stage t−1 to state i at stage t, and the ABM at state i in stage t may be then expressed as $$M_t(i, j) = \sum_{i=nt-n+1}^{nt} r_i c_i, \ 1 \le t \le K + m. \qquad (0\text{-}8)$$

At each stage t, and each state i in the code trellis, the soft-decision Viterbi algorithm may pick the branch with the maximum accumulated metric to reach that state to be the survivor branch. $\phi_t(i)$ may be defined to be the maximum APM of the survivor branch to reach state i at stage t from the starting state at the initial stage. The Viterbi algorithms may record $\xi_t(i)$, which is the state occupied by the survivor path into state i at stage t−1. The trellis may be defined by $J_{i,t}$, which is the set constituting states at stage t−1 that are connected to state i at stage t. T may be used to denote the total number of trellis stages, and S may be used to denote the number of states per trellis stage. The metrics may be calculated in the forward direction, together with the selection of the survivor branch into each state. In case the trellis is terminated, then it may be known that the end state at stage T is 0, and hence the path which results in the maximum $\phi_T(0)$ is the maximum likelihood path. Then, the best path from the final zero state may be found by path trace-back based on a stored history $\xi_t$. Once the best (highest likelihood) state sequence is found, the most likely message bits corresponding to the path transitions may be found.

Figure 9A:
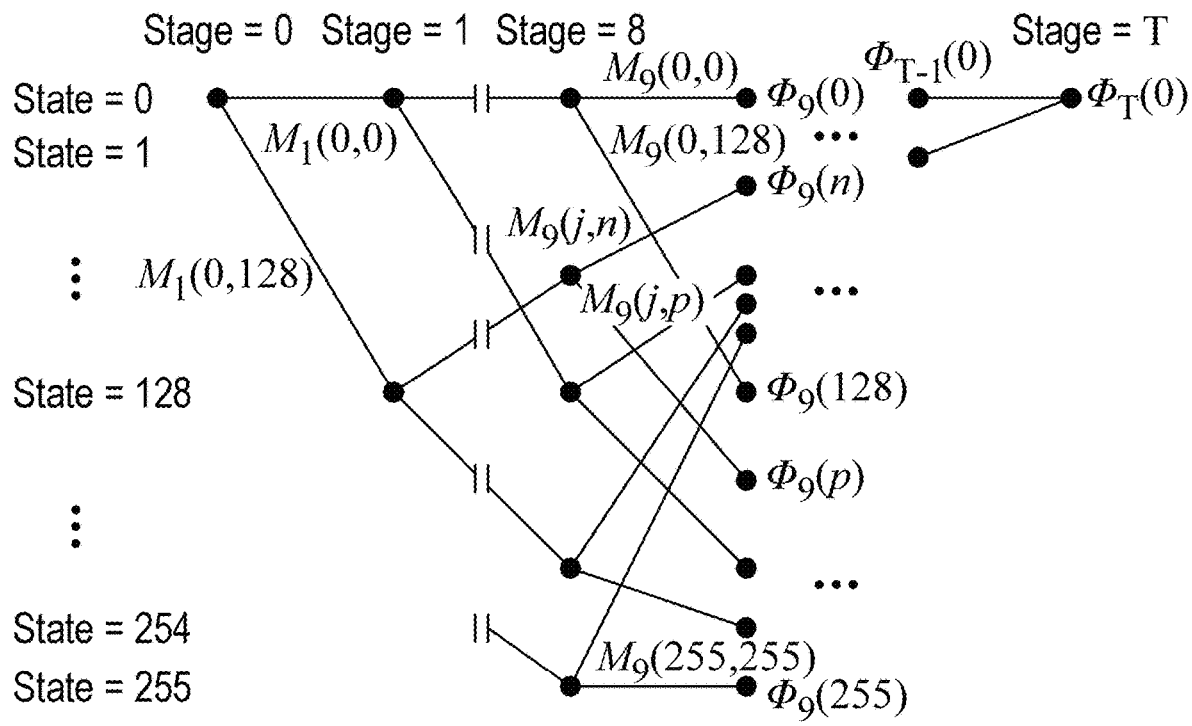
FIG. 9A and FIG. 9B (collectively, FIG. 9) are diagrams depicting examples of trellis decoding structures, according to some embodiments of the present disclosure.
Figure 9B:
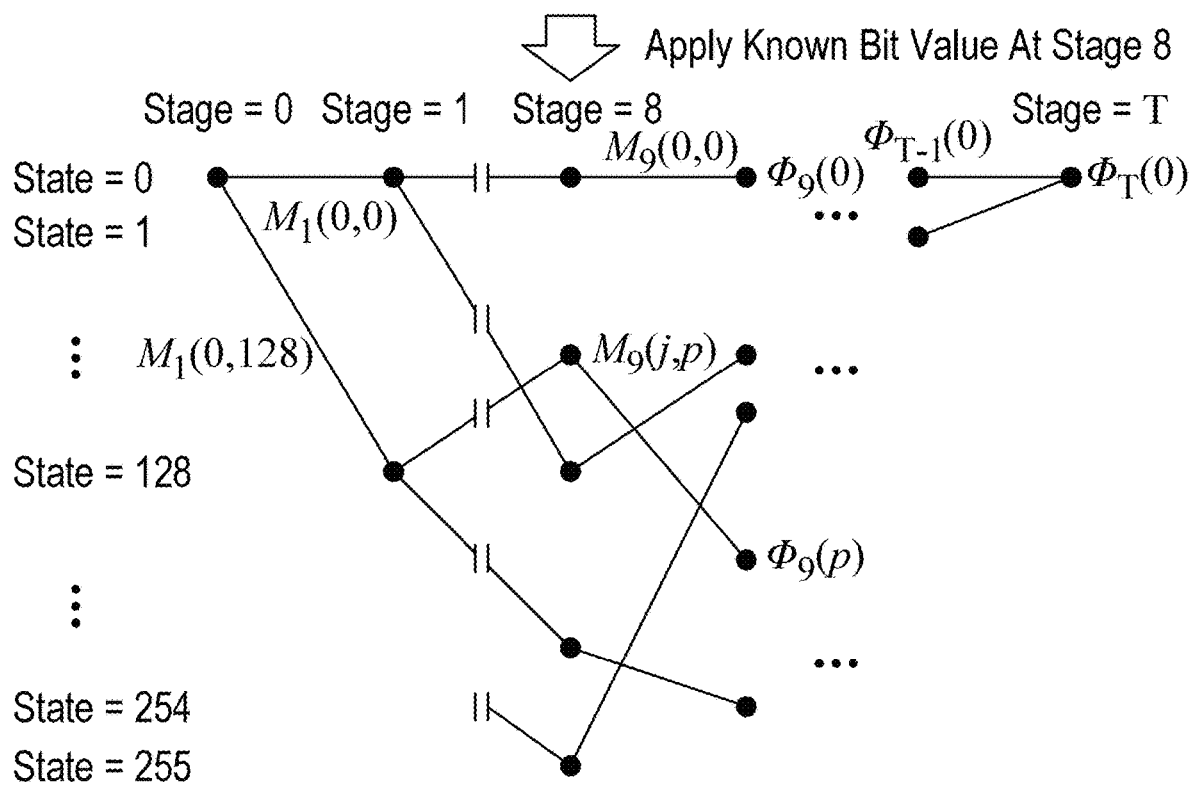

FIG. 9A and FIG. 9B (collectively, FIG. 9) are diagrams depicting examples of trellis decoding structures, according to some embodiments of the present disclosure.

Referring to FIG. 9A, an example of a conventional decoding trellis structure, with S=255 states, is shown. For this trellis structure, each state at stage t may be connected to only two states at stage t−1. Thus, $M_t(j, i)$ may only be calculated for two candidate branches from the two states in $J_{i,t}$ when selecting the survivor branch at state i. When no DCI bits are known, at each stage, $M_t(j, i)$ may be calculated for both candidate branches for each state i.

Soft Viterbi Decoder Design with Known DCI Bits

Referring to FIG. 9B, a modified trellis decoding structure, with S=255 states and with a known bit at stage 8 is shown. In some embodiments of the present disclosure, when the DCI bit is known at each stage t−1, $M_t(j, i)$ may be calculated only for the branch reaching state i caused by the known bit value. Accordingly, candidate code words that contain an invalid bit value at, for example, stage 8 may be removed. For example, a UE may prune candidate code word paths based on the paths being inconsistent with the known bit. As a result, there may be only one branch going out from each outgoing node, and only one branch coming into each incoming node at that stage. For example, the node corresponding to stage 8 and state 128 in FIG. 9A, has two outgoing branches, whereas the same node in FIG. 9B, has only one outgoing branch.

FIG. 10 is a table summarizing a soft-decision Viterbi algorithm, according to some embodiments of the present disclosure.

Referring to FIG. 10, the soft-decision Viterbi algorithm may be summarized as in Table 1. Note that in conventional decoding, $J_{i,t}$ has two branches for each stage. When applying the known bit at stage t−1, $J_{i,t}$ may only contain one branch instead of two branches. In some embodiments, when a priori knowledge of DCI bits is not definite, CA-SSCL decoding of NR PDCCH may retain a certain number of candidate code words to ensure, for those candidate code words, that the a priori known or assumed bits are satisfied.

Figure 11:
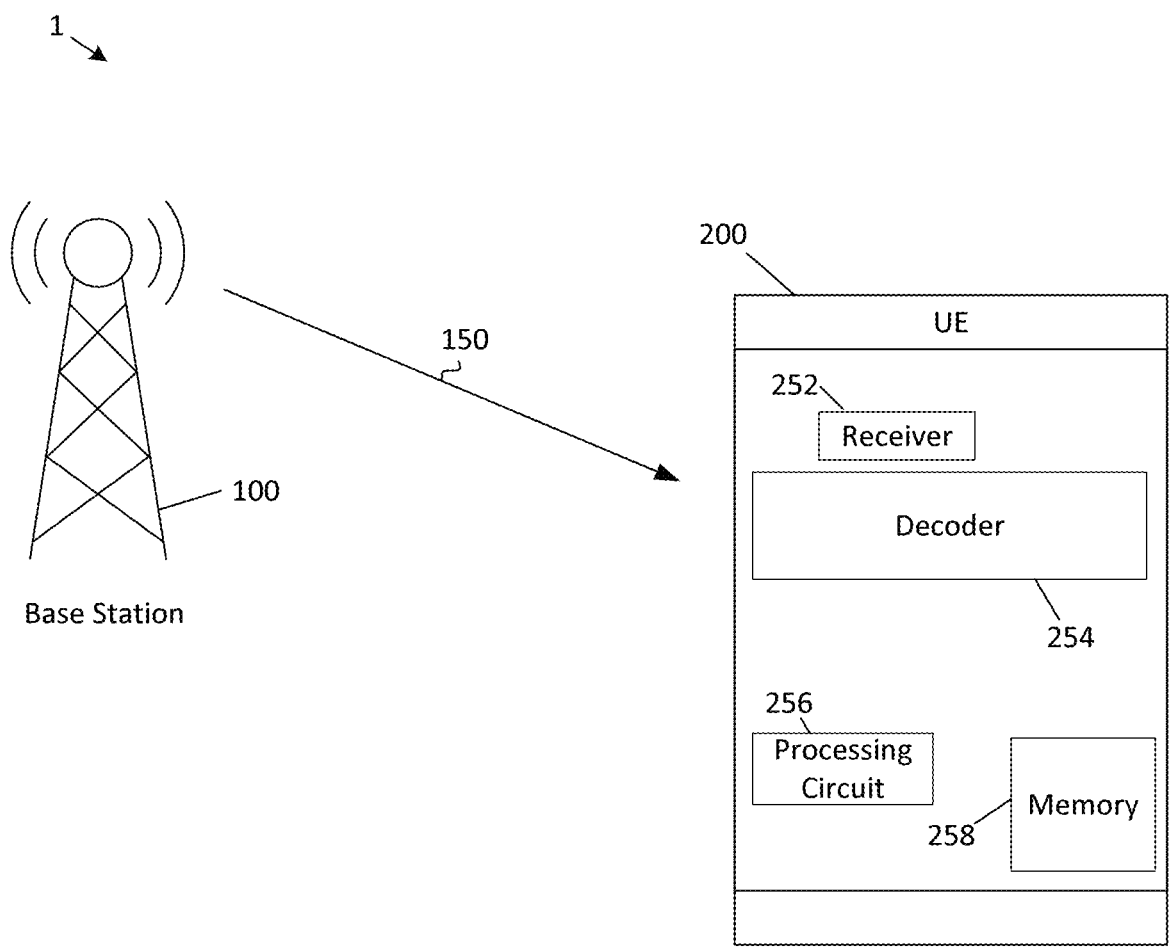
FIG. 11 is a system diagram depicting a system for decoding with known DCI bits, according to some embodiments of the present disclosure.

FIG. 11 is a system diagram depicting a system for decoding with known DCI bits, according to some embodiments of the present disclosure.

Referring to FIG. 11, a system 1 for decoding with DCI bits may include a base station 100 and a UE 200. The base station 100 may transmit a PDCCH 150 including an encoded DCI to the UE 200. A receiver 252 at the UE 200 may receive the PDCCH 150 including the encoded DCI. A decoder 254 of the UE 200 may decode the DCI according to conventional methods and/or according to a method for PDCCH decoding utilizing known DCI bits as discussed above. The UE 200 may include a processing circuit 256 (e.g., a processor) and a memory 258 for storing instructions and data. Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Figure 12:
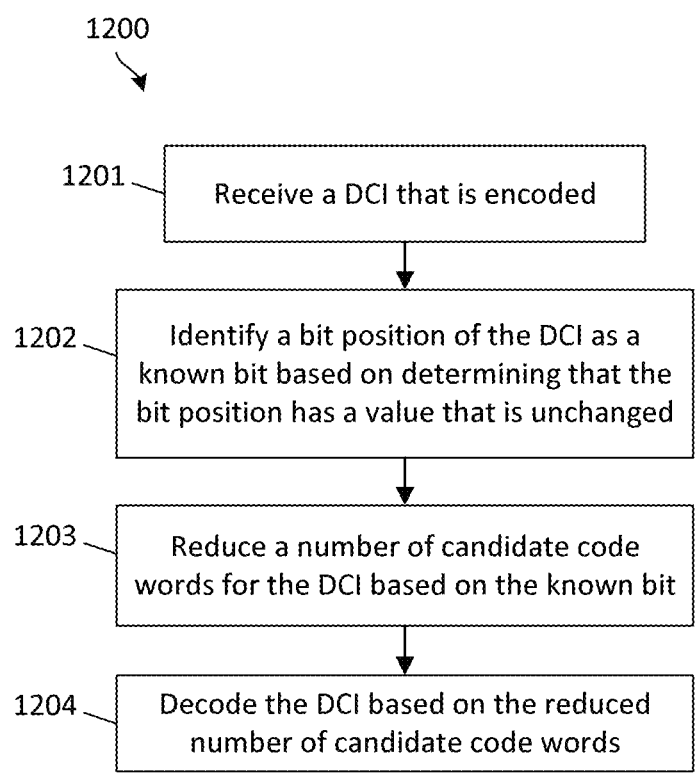
FIG. 12 is flowchart depicting a method of decoding with known DCI bits, according to some embodiments of the present disclosure.

FIG. 12 is flowchart depicting a method of decoding with known DCI bits, according to some embodiments of the present disclosure.

Referring to FIG. 12, a method 1200 for decoding with DCI bits may include the following example operations. The UE 200 may receive a DCI that is encoded (operation 1201); the UE 200 may identify a bit position of the DCI as a known bit based on determining that the bit position has a value that is unchanged (e.g., remains the same) from a previous DCI (operation 1202); the UE 200 may reduce a number of candidate code words for the DCI based on the known bit (operation 1203); and the UE 200 may decode the DCI based on the reduced number of candidate code words (operation 1204). Accordingly, embodiments of the present disclosure provide improvements to PDCCH decoding.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method of decoding, the method comprising:
receiving, by a user equipment (UE), a downlink control information (DCI) that is encoded;
identifying, by the UE, a first bit position of the DCI as a known bit; and
reducing a number of candidate code words for the DCI based on the known bit.

2. The method of claim 1, wherein the identifying the first bit position of the DCI as a known bit comprises:
decoding a first previous DCI by applying no known bit assumptions;
decoding a second previous DCI by applying no known bit assumptions; and
determining that the first bit position has a value that is the same in the first previous DCI and the second previous DCI.

3. The method of claim 1, further comprising:
decoding the DCI by treating the first bit position as a known bit;
failing to successfully decode the DCI; and
decoding the DCI without treating the first bit position as a known bit.

4. The method of claim 1, further comprising:
decoding a full set of an aggregation level (AL) of the DCI without treating any bit positions of the full set as a known bit;
failing to successfully decode the DCI; and
decoding the DCI by treating the first bit position as a known bit, the first bit position corresponding to a subset of the AL that matches with a previous successfully decoded DCI.

5. The method of claim 1, further comprising decoding the DCI according to a successive cancellation list decoding method, wherein the UE is configured to treat, as a special node, a node having the known bit as a leaf node.

6. The method of claim 5, further comprising using $PM_{2^{n-d_v}-1}$ as a path metric for the special node, wherein $$PM_{2^{n-d_v}-1} = \frac{1}{2} \sum_{i=0}^{2^{n-d_v}-1} |\alpha_i| - \eta_i \alpha_i,$$

and
wherein:
$\eta_i$ is $1-2\beta_i$, $\beta_i$ being an i-th bit of a group of frozen bits and known bits at leaves of a special node;
n is a sign (+1 or −1) representation for a bit value (0 or 1) of $\beta_i$;
$d_v$ is a level of the special node in a binary tree representation; and
$\alpha_i$ is a value of the i-th position of an incoming log likelihood ratio (LLR) vector ay for a node v.

7. The method of claim 1, further comprising decomposing an encoded code word into a first linear component code word and a second linear component code word.

8. The method of claim 7, further comprising:
descrambling, by the UE, a channel log likelihood ratio (LLR) by the second linear component code word to produce a first descrambled output;
decoding, by a decoder of the UE, the DCI by using the first descrambled output as an input to the decoder to produce a first decoder output;
scrambling, by the UE, the first decoder output by the second linear component code word to produce a full decoder output comprising an original code comprising the first linear component code word and the second linear component code word;
performing a radio network temporary identifier (RNTI) de-masking operation on a last sixteen CRC bits of the original code; and
performing, by the UE, a cyclic redundancy code (CRC) check on the decoder output based on the performing of the RNTI de-masking operation.

9. The method of claim 7, wherein:
the first linear component code word is the result of encoding a data word having a zero at the first bit position, the first bit position being a known bit position or an original frozen bit position and an unknown bit at a second bit position, and an unknown bit at a second bit position, the second bit position being an unknown bit position; and
the first bit position is labeled as a frozen bit for a decoder.

10. The method of claim 7, wherein:
the second linear component code word is the result of encoding a data word having the known bit at the first bit position and a zero at an unknown bit position.

11. The method of claim 1, further comprising pruning an invalid candidate code word path based on the invalid candidate code word path being inconsistent with the known bit.

12. A user equipment (UE) comprising a processing circuit and being configured to perform a method of decoding, the method comprising:
receiving, by a user equipment (UE), a downlink control information (DCI) that is encoded;
identifying, by the UE, a first bit position of the DCI as a known bit; and
reducing a number of candidate code words for the DCI based on the known bit.

13. The UE of claim 12, wherein the identifying the first bit position of the DCI as a known bit comprises:
decoding a first previous DCI by applying no known bit assumptions;

decoding a second previous DCI by applying no known bit assumptions; and determining that the first bit position has a value that is the same in the first previous DCI and the second previous DCI.

14. The UE of claim 12, wherein the method further comprises:

decoding the DCI by treating the first bit position as a known bit;

failing to successfully decode the DCI; and decoding the DCI without treating the first bit position as a known bit.

15. The UE of claim 12, wherein the method further comprises:

decoding a full set of an aggregation level (AL) of the DCI without treating any bit positions of the full set as a known bit;

failing to successfully decode the DCI; and decoding the DCI by treating the first bit position as a known bit, the first bit position corresponding to a subset of the AL that matches with a previous successfully decoded DCI.

16. The UE of claim 12, wherein the method further comprises decoding the DCI according to a successive cancellation list decoding method, wherein the UE is configured to treat, as a special node, a node having the known bit as a leaf node.

17. The UE of claim 12, wherein the method further comprises decomposing an encoded code word into a first linear component code word and a second linear component code word.

18. The UE of claim 17, wherein the method further comprises:

descrambling, by the UE, a channel log likelihood ratio (LLR) by the second linear component code word to produce a first descrambled output;

decoding, by a decoder of the UE, the DCI by using the first descrambled output as an input to the decoder to produce a first decoder output;

scrambling, by the UE, the first decoder output by the second linear component code word to produce a full decoder output comprising an original code comprising the first linear component code word and the second linear component code word;

performing a radio network temporary identifier (RNTI) de-masking operation on a last sixteen CRC bits of the original code; and performing, by the UE, a cyclic redundancy code (CRC) check on the decoder output based on the performing of the RNTI de-masking operation.

19. The UE of claim 12, wherein the method further comprises pruning an invalid candidate code word path based on the invalid candidate code word path being inconsistent with the known bit.

20. A user equipment (UE) comprising a means for processing and being configured to perform a method of decoding, the method comprising:

receiving, by the UE, a downlink control information (DCI) that is encoded;

identifying, by the UE, a first bit position of the DCI as a known bit; and reducing a number of candidate code words for the DCI based on the known bit.

* * * * *